United States Patent [19]

Wilkinson et al.

[11] Patent Number: 5,444,624
[45] Date of Patent: Aug. 22, 1995

[54] METHOD AND SYSTEM FOR EXCLUSIVELY ASSIGNING A VEHICLE DUTY POSITION IN A COMPUTERIZED VEHICLE SIMULATOR

[75] Inventors: Robert M. Wilkinson, Romeo; Ann L. Davies; Henry C. Davies, both of Lake Orion; Barbara A. Osbon, Auburn Hills, all of Mich.

[73] Assignee: General Dynamics Land Systems Inc., Warren, Mich.

[21] Appl. No.: 997,874

[22] Filed: Dec. 29, 1992

[51] Int. Cl.[6] .............................................. G09B 9/048
[52] U.S. Cl. ............................. 364/424.01; 364/578; 395/500; 434/62
[58] Field of Search ........................... 364/424.01, 578; 434/29, 30, 62, 69, 37, 38, 61, 307 R, 118; D25/1; 395/200, 153, 500; 273/85 R, 434, DIG. 28

[56] References Cited

U.S. PATENT DOCUMENTS

| | | | |
|---|---|---|---|
| 4,052,798 | 10/1977 | Tomita et al. | 434/307 R |
| 4,337,045 | 6/1982 | Jones et al. | 434/29 |
| 4,414,621 | 11/1983 | Brown et al. | 434/307 R |
| 4,538,993 | 9/1985 | Krumholz | 434/118 |
| 4,609,358 | 9/1986 | Sangster | 434/307 R |
| 4,641,255 | 2/1987 | Hohmann | 434/69 |
| 4,704,697 | 11/1987 | Kiremidjian et al. | 395/153 |
| 4,952,152 | 8/1990 | Briggs et al. | 434/69 |
| 5,008,853 | 4/1991 | Bly et al. | 395/153 |
| 5,083,800 | 1/1992 | Lockton | 273/434 X |
| 5,119,319 | 6/1992 | Tanenbaum | 395/153 |
| 5,184,956 | 2/1993 | Langlais et al. | 434/69 |
| 5,228,854 | 7/1993 | Eldridge | 364/423 |
| 5,245,553 | 9/1993 | Tanenbaum | 395/153 |
| 5,255,358 | 10/1993 | Busboom et al. | 395/153 |
| 5,272,652 | 12/1993 | Rosenshein et al. | 434/38 |
| 5,299,197 | 3/1994 | Schlefly | 395/153 |
| 5,299,810 | 4/1994 | Pierce et al. | 273/434 |

OTHER PUBLICATIONS

Nelms, "SIMNET" *National Defense*, Nov. 1987, pp. 67–71.
Nelms, "SIMNET II," *National Defense*, Jul./Aug. 1988, pp. 68–69.
Blau et al., "Networked Virtual Environments," *Computer Graphics*, Mar. 1992, pp. 157–160.
Zyda et al., "NPSNET: Constructing a 3-D Virtual World", *Computer Graphics*, Mar. 1992 pp. 147–157.
Tarlton et al., "A Framework for Dynamic Visual Applications", *Computer Graphics*, Mar. 1992 pp. 161–164.
Sundaram, "Simulating the Electronic Battlefield," *International Defense Review*, Jun. 1989 pp. 795–800.

*Primary Examiner*—Kevin J. Teska
*Assistant Examiner*—Collin W. Park
*Attorney, Agent, or Firm*—Brooks & Kushman

[57] ABSTRACT

A method and system is disclosed for using a computer system to simulate a vehicle including a plurality of vehicle duty positions having corresponding display panels. The vehicle duty positions are linked together to form at least one simulated vehicle. The method and system for assigning vehicle duty positions to simulated vehicles incorporates contention resolution techniques which ensure exclusive assignments. Vehicle duty positions assigned to a common simulated vehicle may communicate with one another using the corresponding display panels.

5 Claims, 6 Drawing Sheets

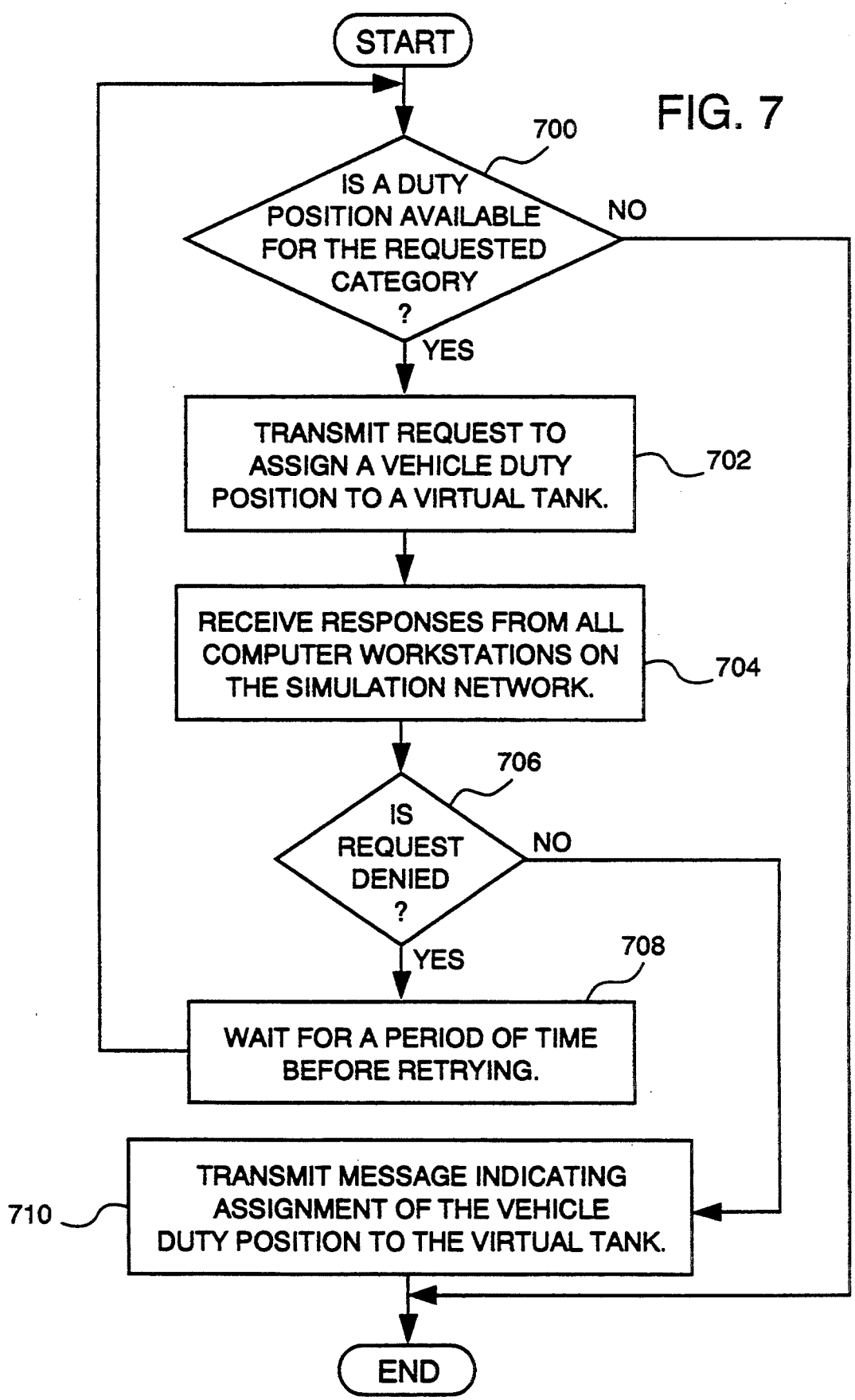

METHOD AND SYSTEM FOR EXCLUSIVELY ASSIGNING A VEHICLE DUTY POSITION IN A COMPUTERIZED VEHICLE SIMULATOR

TECHNICAL FIELD

This invention relates to the field of computerized vehicle simulation and, particularly, to a method and system for defining and managing multiple vehicle duty positions assigned to one or more simulated vehicles using a single computer or a network of interconnected computers.

BACKGROUND ART

Vehicle simulators have been used extensively by the military, aerospace and video game industries to train personnel in vehicle operations. Most of these simulators are limited to simulating a specific vehicle on a single computer work station.

A limited number of vehicle simulators permit multiple computer work stations to be linked together to simulate multiple vehicles. A small fraction of the multiple work station vehicle simulators permit a simulated vehicle to be composed of multiple vehicle duty positions.

Vehicle simulators which simulate vehicles composed of multiple vehicle duty positions have certain advantages over vehicle simulators which simulate vehicles with only one vehicle duty position. Simulations incorporating multiple vehicle duty positions not only teach a trainee how to operate the vehicle controls, but also teach a trainee how to perform his or her duties as a member of a team.

Notwithstanding the advantages of multiple vehicle duty position simulators, their widespread use has been prevented due to the inability of developers to provide efficient and reliable methods and systems for defining training scenarios and providing communication between the various vehicle duty positions. A need therefore exists for a method and system of defining training scenarios and providing communication between vehicle duty positions of a simulated vehicle which are simple, reliable and inexpensive.

SUMMARY OF THE INVENTION

The present invention described and disclosed herein comprises a method and system for simulating a vehicle including a plurality of vehicle duty positions having corresponding display panels using a computer system. The present invention supports both primary vehicle duty positions which control and monitor the virtual vehicle and secondary vehicle duty positions which only monitor the virtual vehicle.

An object of the present invention is to provide a method and system for simulating a vehicle including a plurality of vehicle duty positions having corresponding display panels using a computer system wherein at least two vehicle duty positions can be assigned and linked together to form at least one simulated vehicle.

Another object of the present invention is to provide a method and system for communicating between vehicle duty positions of a simulated vehicle using a computer system wherein assigned message data is routed between at least two vehicle duty positions using virtual network data based on each assigned vehicle duty position.

A further object of the present invention is to provide a method and system for exclusively assigning a vehicle duty position in a computerized vehicle simulator using a computer network having computer work stations. The method and system employs a technique of transmitting a request to assign a vehicle duty position to a virtual vehicle from a requesting computer work station to all other computer work stations of a computer network and awaiting approval or denial indicia of this request from each of the other computer work stations of the computer network.

In carrying out the above objects and other objects of the present invention, a method is provided for simulating a vehicle including a plurality of vehicle duty positions having corresponding display panels using a computer system. The method includes the step of storing display information for defining all of the display panels associated with the vehicle duty positions. The method also comprises the step of assigning at least two vehicle duty positions to a simulated vehicle. The assigned vehicle duty positions are then linked together based on their assignments to form one simulated vehicle. The method further includes the step of storing vehicle status information based on the steps of assigning and linking. Finally, the display information for each display panel is modified based on the vehicle status information and the modified display panel associated with each of the assigned vehicle duty positions is displayed.

In carrying out the above objects and other objects of the present invention, a second method is provided for communicating between vehicle duty positions of a simulated vehicle using a computer system. The method includes the step of assigning at least two vehicle duty positions to a simulated vehicle. The method also comprises the step of linking each of the assigned vehicle duty positions together based on the assignments of the at least two vehicle duty positions to form the simulated vehicle. Virtual network data is then stored based on each assigned vehicle duty position, and message data is assigned to be routed between at least two vehicle duty positions based on the virtual network data. Next, the message data is transmitted from a first assigned vehicle duty position, routed based on the virtual network data, received by a second assigned vehicle duty position and is finally displayed on the display panel of the second assigned vehicle duty position.

In carrying out the above objects and other objects of the present invention, a third method is provided for exclusively assigning a vehicle duty position in a computerized vehicle simulator using a computer network having computer work stations. The method includes the step of transmitting a request to assign a vehicle duty position to a virtual vehicle from a requesting computer work station to all other computer work stations of a computer network. The method also comprises the step of receiving a request approval or an indication of a request denial from each of the other computer work stations of the computer network. Upon detecting that at least one indication of a request denial has been received by the requesting computer work station, the claimed method requires waiting for a period of time before attempting to re-transmit the request to assign the vehicle duty position.

If no request denial indication is received by the requesting computer work station, a message is transmitted from the requesting computer work station to all other computer work stations of the computer network. The transmitted message indicates the assignment of the vehicle duty position of the requesting computer to the virtual vehicle.

Further, in carrying out the above objects and other objects of the present invention, systems are also provided for carrying out the steps of the above-described methods.

One important feature of the present invention is the ability to easily assign a vehicle duty position to a virtual vehicle from any work station. In fact, it is possible to assign and operate multiple vehicle duty positions from the same work station.

Another important feature of the present invention is the ability to communicate between vehicle duty positions regardless of the physical location of the computer work stations controlling either vehicle duty position. In fact, two vehicle duty positions can communicate with one another if the vehicle duty positions are being operated across the country or on the same work station.

Yet another important feature of the present invention is the ability to assign both primary and secondary vehicle duty positions to a virtual vehicle. Primary vehicle duty positions have the capability to control certain aspects of the virtual vehicle. Secondary vehicle duty positions, while able to control limited local functions, can not control any aspects of the virtual vehicle as a whole, and primarily monitor the operation of the virtual vehicle.

A further important feature of the present invention is the ability to ensure only one request for assignment of a vehicle duty position to a virtual vehicle can be processed by the virtual network at a time. This guarantees the reliability and integrity of the virtual network data.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 7 is a flow chart representing a request-then-perform method for resolving conflicts between two or more vehicle duty positions assigned to the same virtual vehicle.

BEST MODE FOR CARRYING OUT THE INVENTION

Figure 1:
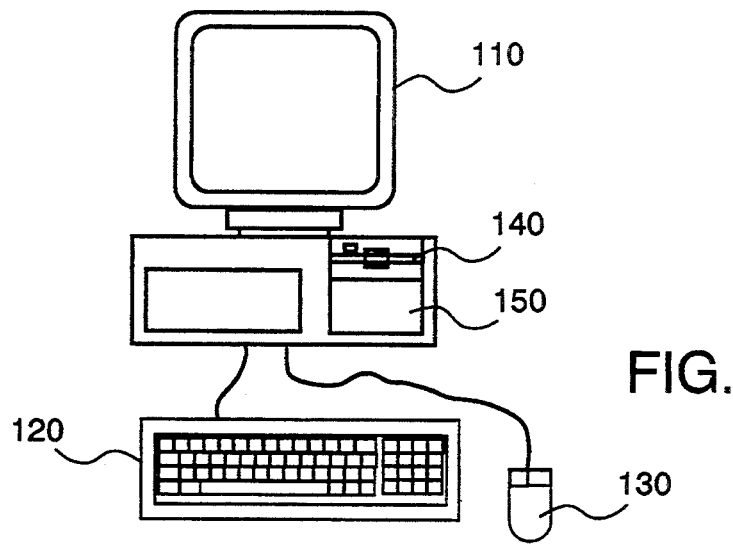
FIG. 1 is a block diagram illustrating a hardware configuration through which the method of the present invention can be implemented.

FIG. 1 is a block diagram which illustrates a preferred hardware configuration through which the method of the present invention can be implemented. The hardware illustrated in FIG. 1 includes a monitor 110, a keyboard 120, a pointing device 130, a magnetic storage device 140, and a chassis 150 including a CPU and random access memory.

In a preferred embodiment, the chassis 150 is a Macintosh IIx personal computer chassis having a mouse 130 and a black and white monitor 110. The Macintosh is equipped with a Symbolics Ivory board which supports the LISP programming language, the Genera operating system, the M1A2 Crew Station Trainer ("CST") software and an interface to a commander's control handle.

The training station shown in FIG. 1, when used in conjunction with the above-referenced software, facilitates training of M1A2 tank personnel by providing a computerized simulation of tank operations. Each training station can be operated in a stand alone mode or can utilize a network to provide flexibility in defining simulation scenarios.

The Registration Screen

Figure 2:
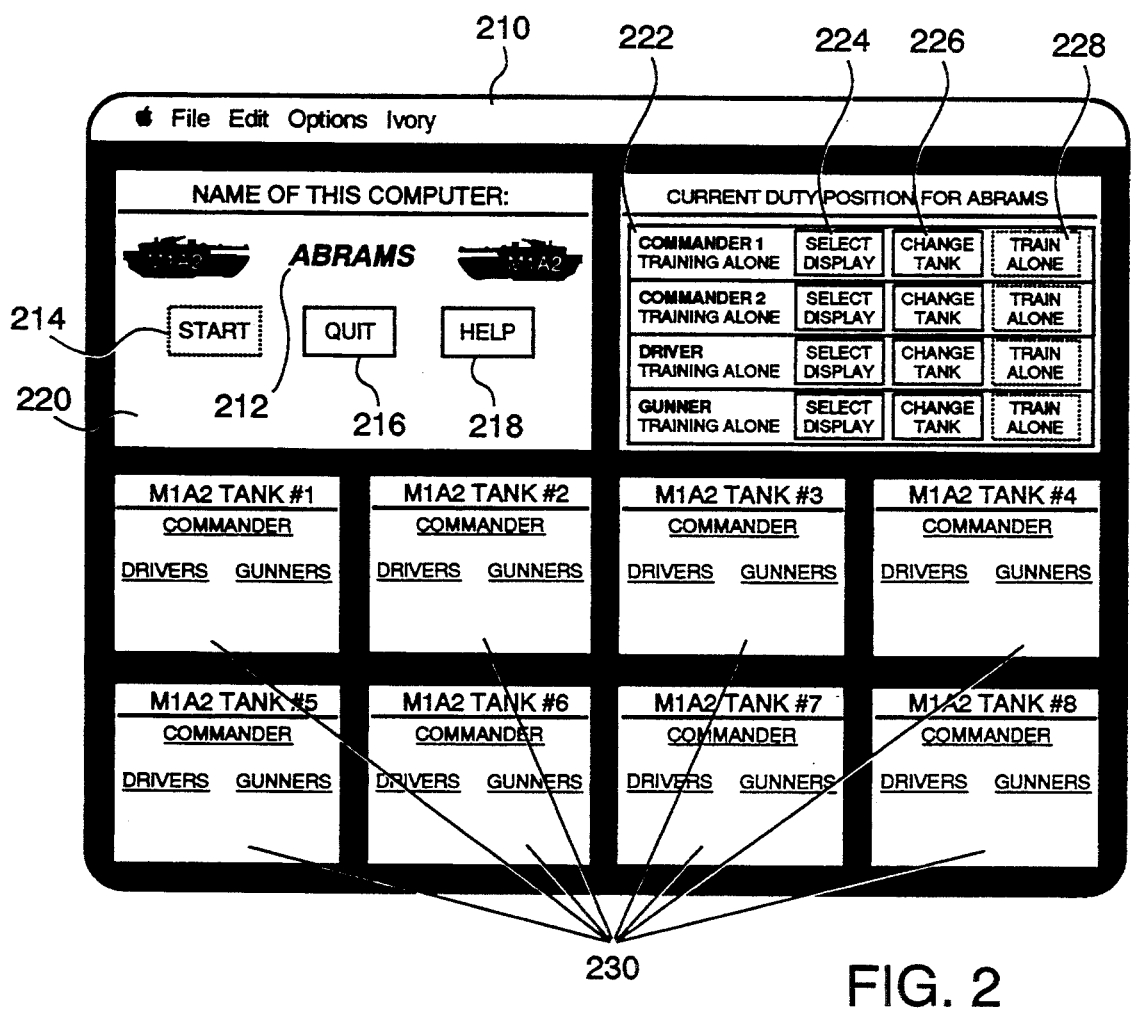
FIG. 2 is a screen display, hereinafter referred to as the registration screen, illustrating the user interface used by the method of the present invention.

FIG. 2, the registration screen, illustrates the user interface used by the method of the present invention. The registration screen is displayed on the monitor of a computer work station at the beginning of a vehicle simulation session. The registration screen comprises a number of elements including a menu bar 210, a training station name 212, a start button 214, a quit button 216, a help button 218, and an advisory area 220. The registration screen further comprises a current duty position list 222, select display buttons 224, change tank buttons 226, and train alone buttons 228. The lower portion of the registration screen consists of eight tank configuration windows 230 which lists the name of the training station currently assigned to each vehicle duty position within each tank.

In the preferred embodiment, each virtual tank can include up to three vehicle duty position categories: commander, driver and gunner. Although each virtual tank is limited to one commander, there may be a number of drivers and gunners assigned to a virtual tank. There can be two types of vehicle duty positions within the driver and gunner categories. A primary vehicle duty position is a vehicle duty position which permits the trainee to monitor and control aspects of the operation of the virtual vehicle. A secondary vehicle duty position affords the trainee only the ability to monitor the operation of the virtual vehicle. Any control action taken by a secondary vehicle duty position does not affect the virtual vehicle as a whole. For virtual tanks in the preferred embodiment, there may be no more than one primary vehicle duty position in any category, but there may be multiple secondary drivers and secondary gunners.

Description Of The Registrar

The registrar is the means by which users of the CST set up various training scenarios. Each machine on the network is capable of handling up to four separate display panels: one driver display panel, one gunner display panel, and two commander display panels. This limitation is imposed only by the user interface. The machines themselves can theoretically handle any number of each display panel type. Using the select display buttons 224, a user can switch at will between any of these four display panels. This provides flexibility in that no particular machine is dedicated as being solely a driver's station, for example. This also allows the user to configure the system in a variety of ways.

Each of the display panels on any given work station is separately configurable. This means that the displays need not have any connection with each other at all. For example, the gunner display panel and commander display panel on a work station are not necessarily related, although the registrar will allow them to be set up so that they are. Each display panel can be set up to train alone by using the train alone buttons 228 or it can be set up to reside within a virtual tank by using the change tank buttons 226.

In train alone mode, the display panel acts as if it were sitting alone on a bench in a laboratory, with no communication allowed to or from it. By assigning display panels to virtual tanks, users of the CST can simulate virtually any type of inter- and intra-tank configuration they desire.

Virtual Tanks

A virtual tank is an abstraction of a real tank. All crew members assigned to the same virtual tank share the same vehicle data, enabling them to view the tank in the same way. For example, if the driver on virtual tank 3 turns on the lights, this change will be seen by the commander on virtual tank 3, regardless of which physical machine he is seated in front of. Each virtual tank has a tank number (integer 0–7) and three lists: one each for the commanders, drivers, and gunners residing the virtual tank. Although the CST user interface is limited to eight virtual tanks, any number is theoretically possible.

Although in the real world it is only possible to have one of each type of crew member per tank, the CST allows multiple crew members of each type for added flexibility in training scenarios (for example, one commander training with several drivers and/or gunners at once). In each list of crew members, only the first, if any, may be the primary crew member of that type. All additional crew members of that type are secondary, and may only receive vehicle data, but not send it. For example, if a virtual tank is set up with one commander and three drivers, the commander can affect all three driver display panels by selecting the appropriate function, but only the primary driver can affect the commander display panel. This mutual exclusion is necessary so that no two drivers perform conflicting operations on the vehicle (i.e. one turns on the lights, one turns them off). Therefore, only one driver should be able to affect the overall state of the vehicle. This driver is called the primary driver.

The same conditions apply to gunners and commanders (the registrar allows only one commander per tank, who is thus always primary). It is possible to have no primary crew member for a given type.

Defining A Training Scenario

When the start button 214 is selected, each display panel will default to a training alone mode. In this situation, a user can select one of the select display buttons 224 to operate a particular display panel associated with the corresponding vehicle duty position. Furthermore, in this case, there is no interaction between any of these display panels. Selections on the registration screen are typically made using a mouse.

In addition to providing a user the capacity to train alone, the registration screen also provides the capability to link each of the display panels together to form a vehicle crew and/or platoon. Communication between vehicle duty positions can be established by using the change tank buttons 226 to assign each vehicle duty position display panel to a virtual tank. The communication links are then established so that any display panels assigned to the same virtual tank will operate as if they were actually in the same physical vehicle. For example, the commander could send way points to the driver, even if they are not training on the same computer work station.

With this flexibility, a single computer work station can be set up to simulate a vehicle crew by assigning that work station's commander, gunner and driver display panels to the same tank. Furthermore, by assigning a commander on one training station, the driver on another training station, and the gunner on a third training station all to the same tank, the three different users of these training stations can interact as a vehicle crew.

The registration screen also provides access to a help function. The user can access the help function by selecting the help button 218. Help text is presented in the advisory area 220.

The Commander Display Panel

Figure 3:
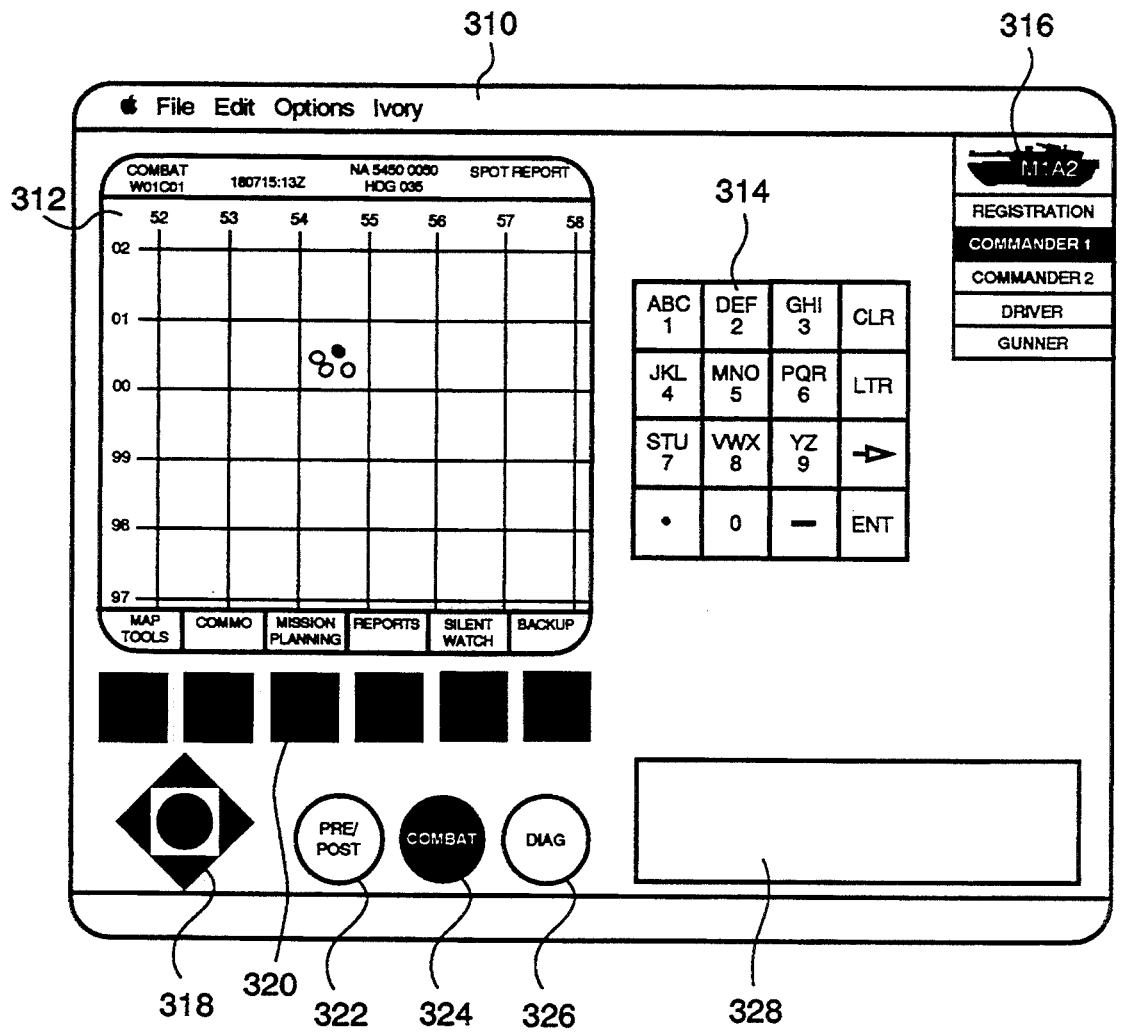
FIG. 3 is a screen display, hereinafter referred to as the commander's display panel, illustrating a display panel associated with a first vehicle duty position.

FIG. 3, the commander's display panel, illustrates the display panel associated with the commander vehicle duty position. This screen is composed of a number of elements used by the commander of an M1A2 tank. A menu bar 310 appears at the top of the screen allowing the user to interact with the vehicle simulation software. The commander's display panel window 312 simulates the commander's display in the M1A2 tank. The keypad 314 is used to enter alphanumeric data. The screen select window 316 is used to select different display panels or to return to the registration screen. The four-way switch 318 is used to enter alphanumeric data or to highlight items in a list. The menu buttons 320 are used to select functions on the display panel. The descriptions of the associated functions are displayed directly above each of the menu buttons 320. The pre-post mode button is used to display the top level menu in a pre-post mode. The combat mode button 324 is used to display the top level menu in combat mode. The diagnostic mode button 326 is used to display the top level menu in diagnostics mode. The information window 328 is used to identify differences between the CST system and the actual tank.

The Driver Display Panel

Figure 4:
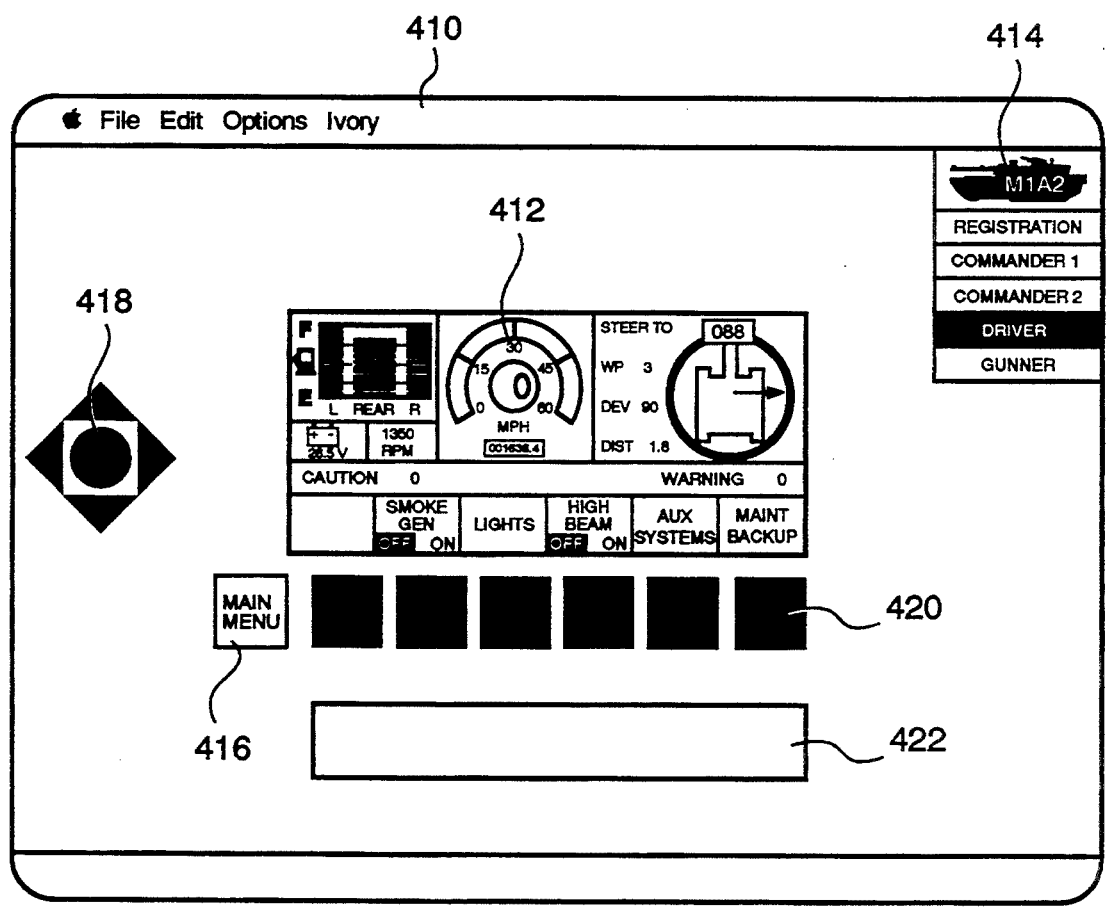
FIG. 4 is a screen display, hereinafter referred to as the driver's display panel, illustrating the display panel associated with a second vehicle duty position.

FIG. 4, the driver's display panel, illustrates the display panel associated with the driver vehicle duty position. A menu bar 410 appears at the top of the screen allowing the user to interact with the vehicle simulation software. The driver's display panel 412 simulates the driver's display in an M1A2 tank. The screen select window 414 is used to select different display panels or to return to the registration screen. The main menu button 416 is used to select the driver's main menu. The menu buttons 420 are used to select functions on the display panel. The descriptions of the associated functions are displayed directly above each of the menu buttons 420. The four-way switch 418 is used to enter alphanumeric data or to highlight items in a list. The information window 422 is used to present system information to the user.

The Gunner Display Panel

Figure 5:
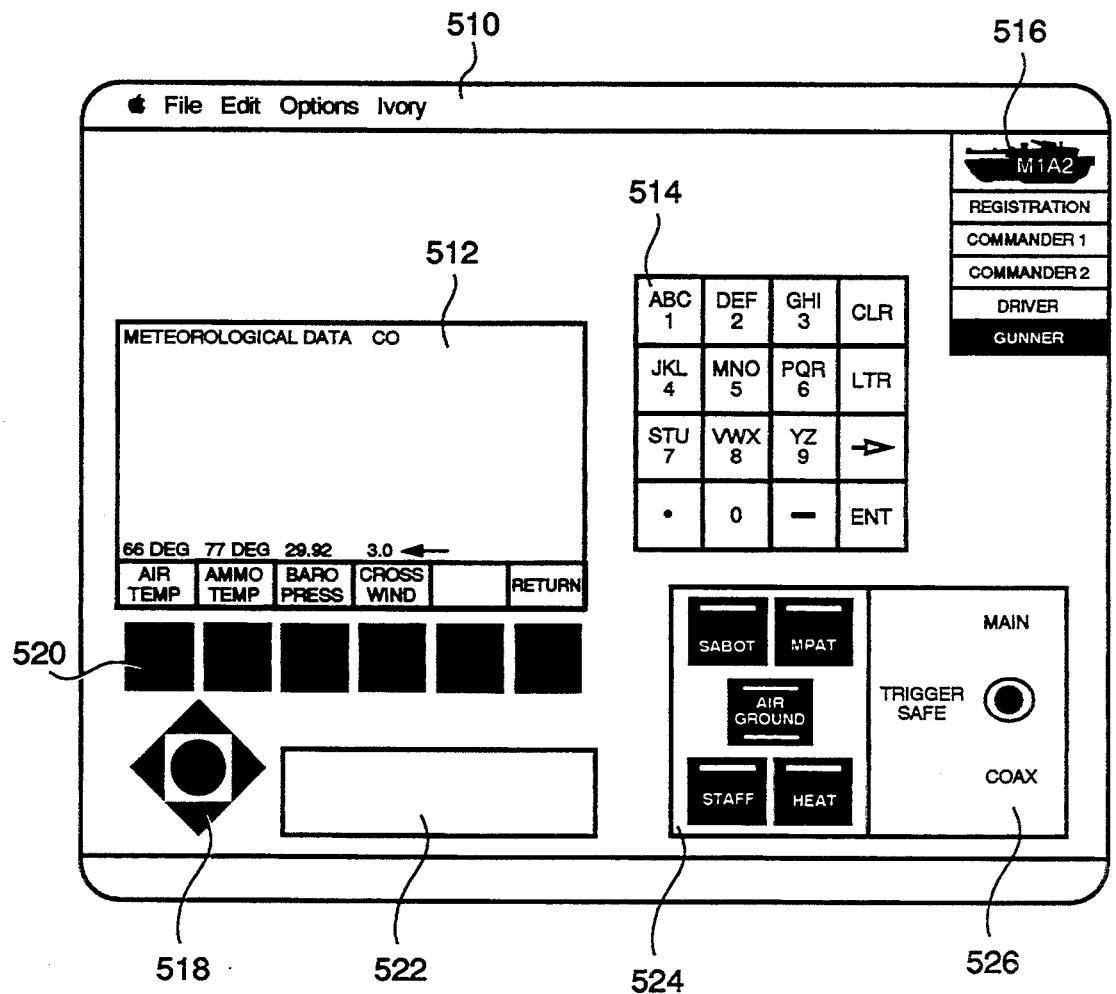
FIG. 5 is a screen display, hereinafter referred to as the gunner's display panel, illustrating a display panel of a third vehicle duty position.

FIG. 5, the gunner's display panel, illustrates the display associated with a gunner vehicle duty position. A menu bar 510 appears at the top of this screen to permit the user to interact with the vehicle simulation software. The gunner's display panel 512 is a window which simulates the gunner's display in an M1A2 tank. The keypad 514 is used to enter numeric data. The screen select window 516 is used to select different display panels or to return to the registration screen. The four-way switch 518 is used to enter numeric data or to highlight items in a list. The menu buttons 520 are used to select functions on the display panel. The descriptions of the associated functions are displayed directly above each of the menu buttons 520. The information window 522 is used to present system information to the user. The ammo select buttons 524 are used to select different ammo types. The gun select switch 526 is used to select the main gun, coax machine gun, or trigger-safe state.

Assigning Vehicle Duty Positions

Figure 6:
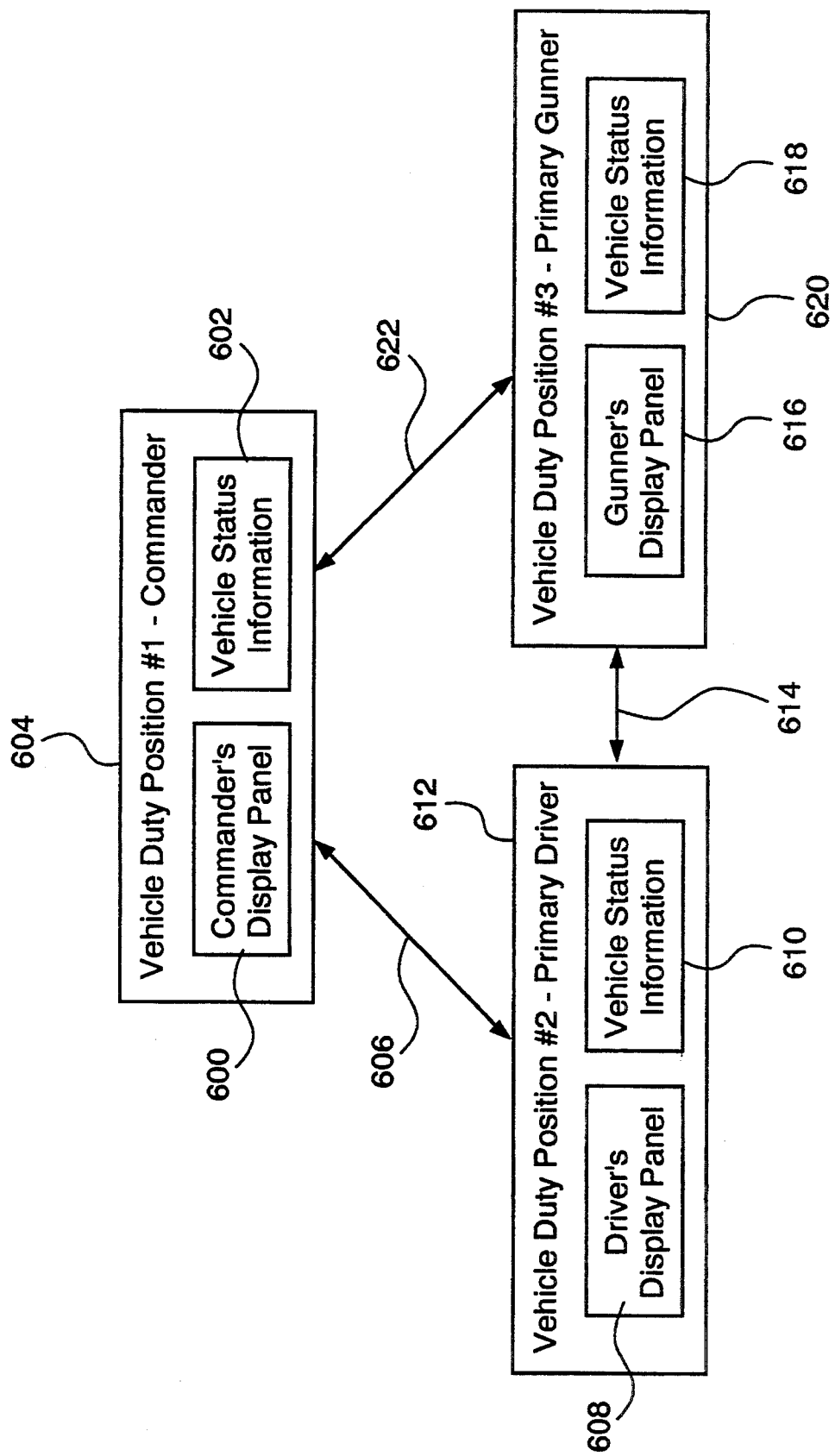
FIG. 6 is a block diagram illustrating the relationship between vehicle duty positions of a virtual vehicle.

FIG. 6 is a block diagram illustrating the relationship between primary vehicle duty positions of a virtual tank. Block 600 represents the stored display information for defining the commander's display panel. Block 608 represents the stored display information for defining the primary driver's display panel, and block 616 represents the stored display information for defining the primary gunner's display panel. When a vehicle duty position is assigned to a virtual tank using the registration screen of FIG. 2, each of the vehicle duty positions assigned to a virtual tank are linked together. Lines 606, 614 and 622 represent this step of linking. After the assigned vehicle duty positions are linked together, vehicle status information represented by blocks 602, 610 and 618 are stored in the computer work station associated with each vehicle duty position. The display information for display panels 600, 608 and 616 are modified based on the vehicle status information of blocks 602, 610 and 618. Each modified display panel is displayed on the monitor of the computer work station associated with each vehicle duty position.

Mutual Exclusion

FIG. 7 is a flow chart representing a request-then-perform method for resolving conflicts between two or more vehicle duty positions assigned to the same virtual tank.

Referring now to FIG. 7, at block 700, the availability of the requested vehicle duty position is tested. Due to the limited number of vehicle duty positions available to each virtual tank, the preferred embodiment of the present invention processes this step. It is conceivable that other embodiments with different resources would not require this step. At block 702, before a work station may assign a vehicle duty position to a virtual tank, the work station must send a request to all other work stations on the simulation network.

At block 704, the requesting computer work station awaits and receives responses to the transmitted request from all other computer work stations on the simulation network. Responses considered by the requesting computer work station can take three forms, a request approval, a request denial or a null response. In cases in which a null response is received, a request denial is inferred.

Referring now to blocks 706 and 708, if any of the responses received from the other computer work stations on the simulation network indicate a request denial, the requesting work station will retransmit the assignment request after waiting for a period of time.

At block 710, if no request denial indication is received by the requesting computer work station, the requesting computer work station will transmit a message to each of the other computer work stations on the simulation network indicating the assignment of the vehicle duty position to the virtual tank.

While the best mode for carrying out the invention has been described in detail, those familiar with the art to which this invention relates will recognize various alternative designs and embodiments for practicing the invention as defined by the following claims.

What is claimed is:

1. A method for exclusively assigning a vehicle duty position in a computerized vehicle simulator using a computer network having computer work stations, the method comprising:
   (a) transmitting a request to assign a vehicle duty position to a virtual vehicle from a requesting computer work station to all other computer work stations of a computer network;
   (b) receiving either a request approval or a request denial indication from each of the other computer work stations of the computer network;
   (c) if at least one request denial indication is received by the requesting computer work station, waiting for a period of time and proceeding to step (a); and
   (d) if no request denial indication is received by the requesting computer work station, transmitting a message from the requesting computer work station to all other computer work stations of the computer network indicating the assignment of the vehicle duty position of the requesting computer to the virtual vehicle.

2. The method of claim 1 wherein the step of transmitting includes the step of determining the availability of a vehicle duty position.

3. The method of claim 1 wherein step (d) includes the step of determining that the vehicle duty position is a primary vehicle duty position.

4. The method of claim 1 wherein step (d) includes the step of determining that the vehicle duty position is a secondary vehicle duty position.

5. A system for exclusively assigning a vehicle duty position in a computerized vehicle simulator using a computer network having computer work stations, the system comprising:
   means for transmitting a request to assign a vehicle duty position to a virtual vehicle from a requesting computer work station to all other computer work stations of a computer network;
   means for receiving either a request approval or a request denial indication from the each of the other computer work stations of the computer network; and
   control means for performing the steps of:
      waiting for a period of tame if at least one request denial indication is received by requesting computer work station; and
      transmitting a message from the requesting computer work station to all other computer work stations of the computer network indicating the assignment of the vehicle duty position of the requesting computer to the virtual vehicle if no request denial indication is received by the requesting computer work station.

* * * * *